June 24, 1969  J. L. JOHNSON  3,451,269
FLUID TEMPERATURE RESPONSIVE APPARATUS
Filed Nov. 25, 1966
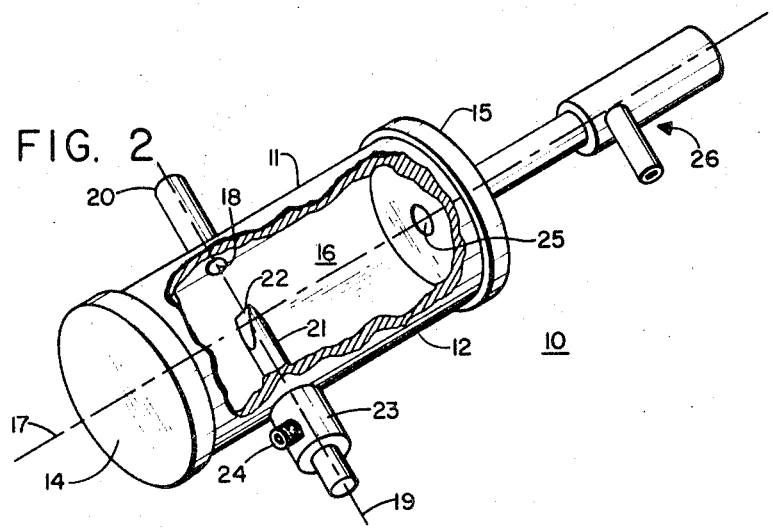
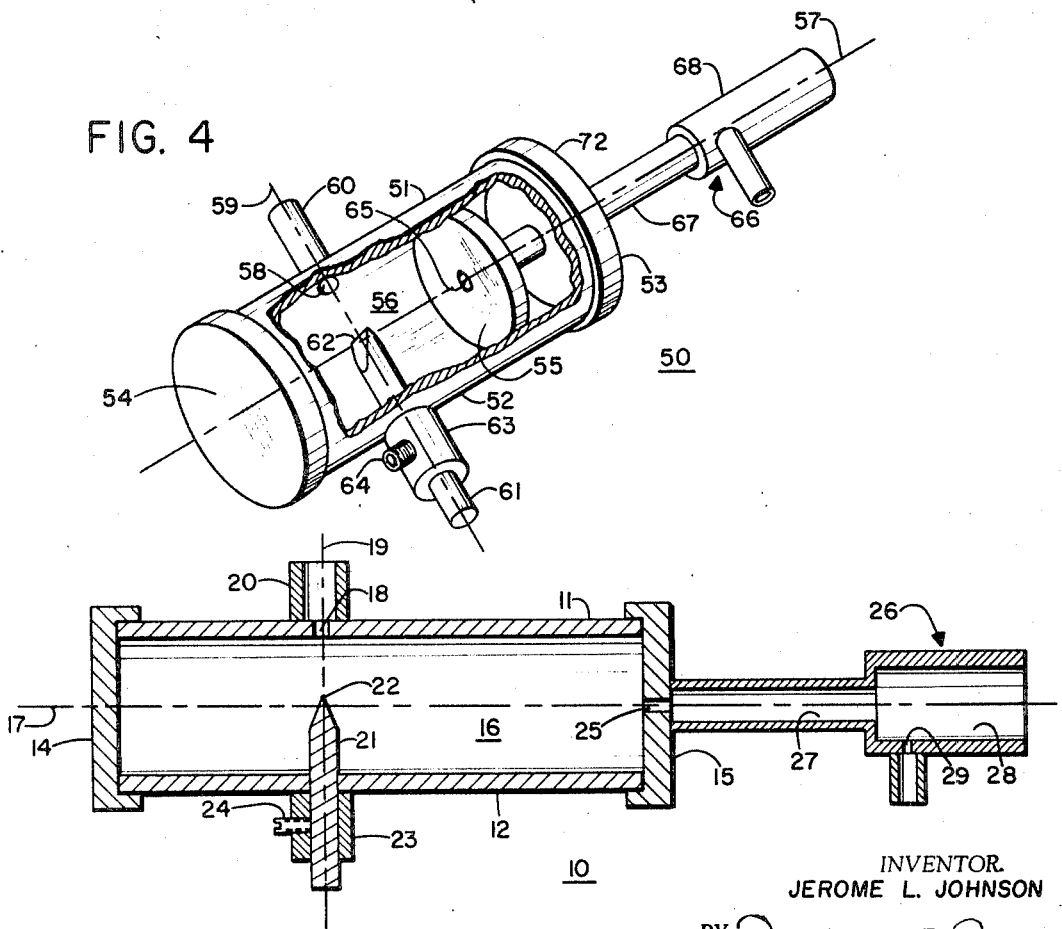
INVENTOR.
JEROME L. JOHNSON _United States Patent Office_ 3,451,269
Patented June 24, 1969

3,451,269
FLUID TEMPERATURE RESPONSIVE APPARATUS
Jerome L. Johnson, St. Paul, Minn., assignor to Honeywell Inc., Minneapolis, Minn., a corporation of Delaware
Filed Nov. 25, 1966, Ser. No. 597,159
Int. Cl. G01k 1/08
U.S. Cl. 73—346                                              12 Claims

ABSTRACT OF THE DISCLOSURE

A low-cost pure fluid temperature sensor which produces an oscillating signal whose frequency is a unique function of the temperature of the fluid therein. The temperature sensor comprises a cylindrical chamber within which a splitter element is provided. An inlet port in the chamber wall is located such that a stream of fluid introduced into the chamber through the inlet port impinges on the splitter. The stream oscillates about the splitter at a frequency which is a function of the geometry of the chamber and the acoustic properties of the fluid.

BACKGROUND OF THE INVENTION

Field of the invention

This invention relates generally to fluid handling apparatus and more specifically to pure fluid devices responsive to temperature.

Description of the prior art

Pure fluid devices responsive to temperature and pressure are attractive for use in monitoring and control systems because of their relative simplicity, high reliability, and exceptional environmental tolerance. Prior art devices which are sensitive to temperature, pressure, and other parameters are known as is shown by a number of patents including a patent entitled Negative Feedback Oscillator, Patent No. 3,158,166, issued to R. W. Warren. In general, these temperature and pressure sensitive devices are fluid oscillators which produce oscillations at a frequency which is a function of the temperature and/or pressure of the working fluid therein. The prior art oscillators have generally been of sandwich construction wherein the fluid passages and chambers have been machined or molded into the inner layers as in the above referenced patent. Devices of this design have the following disadvantages: (1) relatively complicated machining and/or molding are required in their construction; and (2) once constructed, adjustments are not easily made to allow for optimum operation over a range of pressures or at a frequency other than those for which the device was designed.

The applicant departs from the prior art fluid oscillator designs by providing a fluid oscillator which is substantially cylindrical in form. This unique design elminates much of the expensive machining and/or molding required in the manufacture of prior art oscillators and results in an order of magnitude cost reduction over the prior art devices. In addition, the operating frequency of the applicants temperature sensor may be easily adjustable. Furthermore, proper operation of the applicant's device does not require that the device cavity be symmetrical about the axis of the inlet port. A device of the applicant's design is further unique in that the device itself can be mounted directly in high temperature fluid surroundings. The applicant's design is, therefore, particularly applicable to sensing temperature in the combustion chamber of a gas turbine engine or the like wherein an extremely high operating temperature is encountered and a fluid is readily available.

SUMMARY OF THE INVENTION

Briefly, the applicant's invention comprises a cylindrical chamber into which the fluid whose temperature is to be sensed is introduced through an inlet port. The fluid stream from the inlet port impinges on a splitter element located inside the chamber and oscillates about its apex at a frequency indicative of the fluid temperature. The fluid is then exhausted through an outlet port in the housing wherepon means are provided for sensing the oscillation frequency of the outlet stream. The housing may be fitted with piston means slideable along the axis of the chamber whereby the operating frequency of the sensor can be adjusted.

A more complete understanding of the present invention will be obtained upon examination of the following specification and claims when read with reference to the drawings of which:

FIGURE 1 is a longitudinal cross section of one embodiment of the applicant's invention;

FIGURE 2 is a partially cutaway isometric view of the embodiment of the applicant's invention shown in FIGURE 1;

FIGURE 4 is a partially cut away isometric view of the embodiment of the applicant's inventoin shown in FIGURE 3.

Like elements in different views are referred to by like reference numerals.

Figure 3:
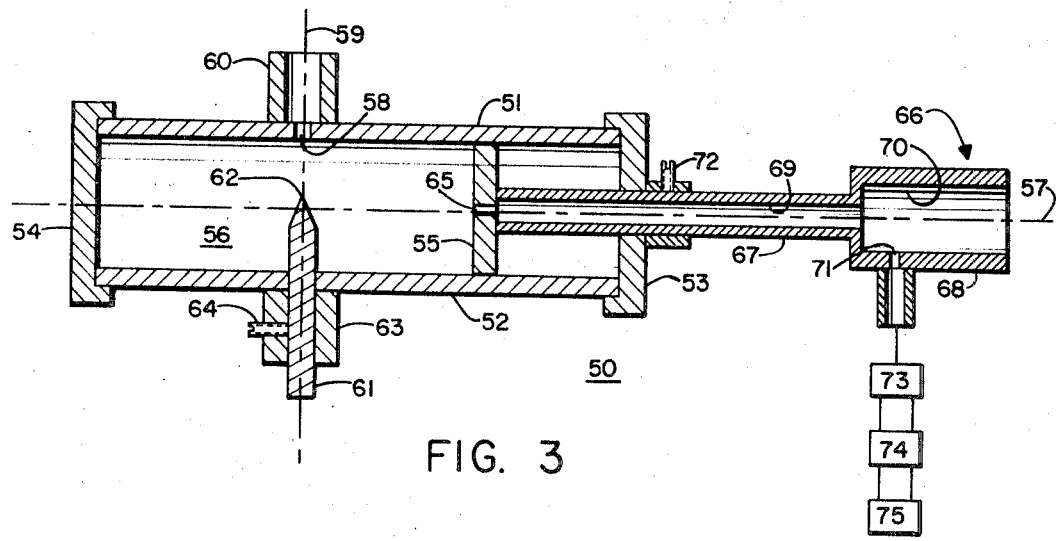
FIGURE 3 is a longitudinal cross section of a second embodiment of the applicant's invention.

Referring now to FIGURES 1 and 2, reference numeral 10 generally identifies one embodiment of the applicant's temperature sensor. Reference numeral 11 generally identifies housing means for temperature sensor 10 having a cylindrical cavity therein. Housing means 11 includes housing section 12 and end caps 14 and 15. End caps 14 and 15 may be attached to housing section 12 by any suitable means (not shown) such as welding, adhesives or bolts or end caps 14 and 15 may be pressed onto housing section 12. Housing section 12 and end caps 14 and 15 cooperate to form a three-dimensional cylindrical chamber 16. For the purposes of this specification, a three-dimensional chamber is defined to be a chamber whose dimensions transverse to the incoming fluid stream are large (typically 8 to 20 times) the maximum dimension of the inlet port. A temperature sensor having a three-dimensional chamber differs from the prior art temperature sensors which are of sandwich construction wherein the thickness of the interaction chamber is substantially the same as the height of the inlet orifice. The prior art devices can be classified generally as two dimensional devices. Chamber 16 is aligned with an axis 17.

An inlet port 18 in fluid communication with chamber 16 is provided in housing means 11. Inlet port 18 defines an axis 19. Axis 19 is substantially perpendicular to axis 17 and intersects therewith. Inlet port 18 may be provided with an inlet extension 20 as shown in FIGURES 1 and 2 to facilitate connection of temperature sensor 10 to some remote fluid supply whose temperature is to be sensed. Inlet extension 20 may be attached to housing means 11 by any suitable means such as welding or adhesives (not shown).

A splitter element 21 is provided having its apex 22 located on axis 19. In the particular embodiment illustrated, splitter element 21 is attached to the wall of housing means 11 by means of a mounting collar 23 and a set screw 24. Mounting collar 23 may be attached to housing means 11 by any suitable means such as welding or adhesives (not shown). The particular embodiment shown allows the distance which splitter element 21 extends into chamber 16 parallel to axis 19 to be varied. Other means of mounting splitter element 21 will be apparent to those skilled in the fluid art.

Splitter element 21 illustrated in FIGURES 1 and 2 is shown as being symmetrical with respect to and parallel to axis 19 and having a wedge shaped end oriented toward inlet port 18. Proper operation of the applicant's temperature sensor can also be achieved with splitter elements which are not symmetrical with respect to or parallel to axis 19. Also the end of splitter element 21 oriented toward inlet port 18 need not be wedge shaped. It may also be cone shaped. However, it is necessary that apex 22 of splitter element 21 be aligned with inlet port 18. Other splitter element configurations will be apparent to those skilled in the fluid art. The applicant has found that for fluid inlet pressures ranging from 4 to 50 p.s.i.g., optimum results are achieved by using a symmetrical wedge shaped splitter element wherein the plane faces of the wedge shaped end form an angle of between 60° and 75° and by locating apex 22 at a distance slightly less than one half the distance across chamber 16 along axis 19 from inlet port 18 (as shown in FIGURE 1).

An outlet port 25 in fluid communication with chamber 16 is provided in end cap 15. Outlet port 25 is aligned with axis 17 as shown in FIGURES 1 and 2. For proper operation of the applicant's device, a positive fluid pressure must be maintained inside chamber 16. That is, the impedance to fluid flow provided by outlet port 25 must be greater than the impedance to fluid flow provided by inlet port 18. In the applicant's device this is accomplished by providing outlet port 25 with a smaller cross sectional area than the cross sectional area of inlet port 18. As a typical example, the cross sectional area of outlet port 25 equals .0109 square inch and the cross sectional area of inlet port 18 equals .0113 square inch.

Outlet port 25 of the applicant's temperature sensor may be provided with a fluid coupler 26 as shown in FIGURES 1 and 2. The purpose of the fluid coupler 26 is to separate the acoustic output signal from the gas flowing out of the temperature sensor. Fluid coupler 26 has an inlet passage 27, an output passage 28, and a pickoff passage 29. Inlet passage 27 is in fluid communication with output port 25. Fluid coupler 26 may be attached to end cap 15 by any suitable means (not shown). The dimensions of fluid coupler 26 should be such that fluid coupler 26 furnishes less impedance to fluid flow than does outlet port 25.

The operation of the applicant's temperature sensor will now be explained with reference to FIGURES 1 and 2. The fluid whose temperature is to be sensed is present at inlet port 18 and has a pressure $P_1$. The fluid present at outlet passage 28 has a pressure $P_2$ less than pressure $P_1$. The flow of the working fluid will therefore be in inlet port 18, through chamber 16, and out outlet passage 28. Inlet port 18 directs a fluid stream at splitter element 21. A portion of fluid stream flows along axis 19 until it impinges on apex 22 of splitter element 21. Acoustical pressure waves are generated which force the gas stream into oscillation. The frequency of oscillation is proportional to the acoustic velocity and the path length of the pressure wave. The frequency of oscillation is expressed analytically by:

$$\text{Frequency} = K\sqrt{\gamma RT}$$

K=proportionality factor depending on chamber dimensions
$\gamma$=ratio of specific heats
R=gas constant
T=temperature It is therefore apparent that conditions created by the geometry of chamber 15 and splitter element 21, the relative cross sectional areas of inlet port 18 and outlet port 25, and the characteristics of the fluid within chamber 16 determine frequency of oscillation the fluid stream about apex 22 of splitter element 21. The device geometry is fixed for any given application and the acoustic properties of the fluid within the device is essentially a unique function of the temperature of the fluid. Therefore, the frequency of oscillation is substantially a unique function of the temperature of the fluid.

The oscillation of the fluid stream causes a train of pressure pulses to be generated within chamber 16. The pressures pulses propagate through chamber 16 into outlet port 25 and into fluid coupler 26. In fluid coupler 26, the acoustic intelligence, in the form of an oscillating signal, is separated from the working fluid flow. The working fluid is then exhausted into a region of ambient fluid pressure $P_1$. The frequency of the oscillating signal which is indicative of the fluid temperature within the temperature sensor is sensed at pickoff passage 29 and may be used in any desired monitoring or control system.

FIGURES 3 and 4 illustrate an alternate embodiment of the applicant's temperature sensor. Reference numeral 50 generally identifies the alternate embodiment of the applicant's temperature sensor. Reference numeral 51 identifies housing means for temperature sensor 50 having a cylindrical cavity therein. Housing means 51 includes housing section 52 and end caps 53 and 54. End caps 53 and 54 may be attached to housing section 52 by any suitable means (not shown).

The end of housing section 52 which is provided with end cap 53 is also fitted with piston means 55. Housing section 52, end cap 54, and piston means 55 form a three-dimensional cylindrical cavity 56 which is aligned with an axis 57. Piston means 55 is slideable relative to housing means 51 along axis 57.

An inlet port 58 in fluid communication with chamber 56 is provided in housing means 51. Inlet port 58 is aligned with an axis 59. Axis 59 is substantially perpendicular to axis 57 and intersects therewith as shown in FIGURES 3 and 4. Inlet port 58 may be provided with an inlet extension 60 to facilitate connection of temperature sensor 50 to some remote fluid supply whose temperature is to be sensed. Inlet extension 60 may be attached to housing section 52 by any suitable means (not shown).

A splitter element 61 is provided having its apex 62 aligned with inlet port 58. In the particular embodiment illustrated, splitter element 61 is attached to housing section 52 by means of a mounting collar 63 and a set screw 64. Mounting collar 63 may be attached to housing section 52 by any suitable means. The particular embodiment shown allows for varying the distance which splitter element extends into chamber 56 parallel to axis 59. Other means of mounting splitter element 61 will be apparent to those skilled in the fluid art. Also, the applicant does not wish to be restricted to splitter elements of a configuration shown in FIGURES 3 and 4. Other splitter element configurations will be apparent to those skilled in the fluid art.

An output port 65 in fluid communication with three-dimensional chamber 56 is provided in piston means 55. For proper operation of the applicant's device, outlet port 65 must provide a greater impedance to fluid flow than inlet port 58.

Outlet port 65 of piston means 55 is provided with a fluid coupler 66. The purpose of the fluid coupler 66 is to separate the acoustic output signals from the gas flowing out of the temperature sensor. Fluid coupler 66 comprises an inlet tube 67 and an outlet tube 68. Inlet tube 67 encloses inlet passage 69 which is in fluid communication with outlet port 65. Outlet tube 68 provides an outlet passage 70 and a pickoff passage 71. Inlet tube 67 of fluid coupler 66 is sufficiently long to permit piston means 55 to be positioned anywhere along axis 57 between splitter element 61 and end cap 53 of housing means 51. The dimensions of fluid coupler 66 must be such that fluid coupler 66 provides less impedance to fluid flow than does outlet port 65.

End cap 53 of housing means 51 provides a passage to accommodate inlet tube 67 of fluid coupler 66. Piston means 55 may be locked in position by means of set screw 72 located in end cap 53.

Temperature sensor 50 produces a train of pressure pulses indicative of the temperature of the fluid within chamber 56 in the manner previously described.

FIGURE 3 also illustrates one system wherein the applicant's temperature sensor is provided with a temperature readout means. The readout means comprises a piezoelectric pressure transducer 73, a charge amplifier 74, and an electronic counter 75.

In operation, a train of pressure pulses having a frequency indicative of the temperature of the fluid within temperature sensor 50 is present in pickoff passage 71. Pressure transducer 73 converts the train of pressure pulses present in pickoff passage 71 to a train of electrical pulses having the same frequency as the train of pressure pulses. The electrical pulses are amplified by means of charge amplifier 74. The train of amplified pulses from charge amplifier 74 is provided to electronic counter 75. Counter 75 then displays the frequency of the train of pressure pulses coming from temperature sensor 50 which is indicative of the temperature of the fluid within temperature sensor 50.

The system illustrated in FIGURE 3 is intended only as an example of the systems in which the applicant's fluid temperature sensor can be used. It will be apparent to those skilled in the art that the applicant's temperature sensor may be used with many other monitoring or control systems. These monitoring and control systems may be mechanical, electrical, or fluid or combinations of these systems.

The adjustable feature of the splitter elements illustrated in FIGURES 1-4 allows for compensation for erosion of the splitter elements by hot gases flowing through the temperature sensor and for adjusting the distance which the splitter elements extend into the chamber for optimum performance over any desired range of input pressures. For example, the applicant has found that for operation with air ranging in pressure from 4 to 50 p.s.i.g., the optimum distance for the splitter element to extend into the chamber is slightly greater than one half the distance across the chamber. The adjustable feature also allows for convenient replacement of the splitter element as necessary.

The alternate embodiment of the applicant's temperature sensor shown in FIGURES 3 and 4 incorporates piston means slideable along axis 57 of chamber 56 whereby the geometry of chamber 56 may be changed. Since the operating frequency is a function of the geometry of chamber 56, slideable piston means 55 makes possible the choice of an optimum operating frequency. It should be noted that chamber 56 is not required to be symmetrical about axis 59 for proper operation of the applicant's temperature sensor.

Figure 5:
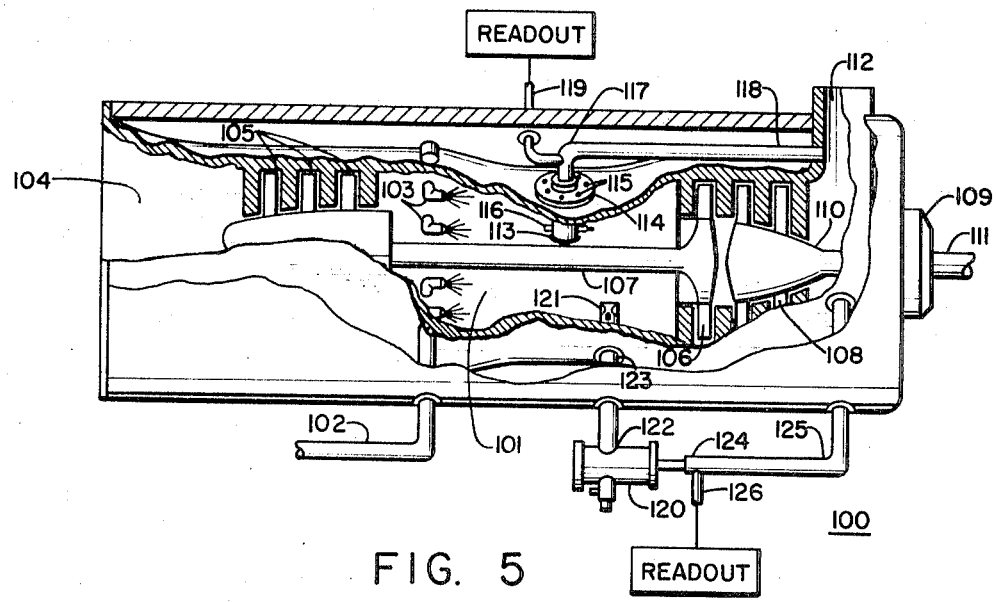
FIGURE 5 is a partially cut away longitudinal view of a gas turbine engine showing two different installations of the applicant's temperature sensor for sensing combustion chamber temperatures.

Referring now to FIGURE 5, reference numeral 100 generally identifies a gas turbine engine having a combustion chamber 101. Reference numeral 102 refers to the fuel supply line which supplies fuel to combustion chamber 101 through fuel nozzles 103. Air at substantially ambient pressure is brought in through intake 104, compressed by means of compressor stages 105, and introduced into chamber 101 where the fuel is burned. Hot high pressure exhaust gases then pass through the compressor drive turbine 106 which drives compressor stages 105 by means of shaft 107. The exhaust gases then drive output turbine 108 which is connected to gear box 109 by means of shaft 110. Output shaft 11 connects gear box 109 to an external load which is not shown. From output turbine 108, the exhaust gas passes through exhaust duct 112 and back into the atmosphere at essentially ambient pressure.

In one arrangement shown in FIGURE 5 the applicant's temperature sensor 113 is installed inside combustion chamber 101. In this installation, temperature sensor 113, similar to temperature sensor 10, is shown as installed through a port in the wall of combustion chamber 101 and held in place by means of a mounting flange 114 and a plurality of bolts 115. The hot high pressure gas whose temperature is to be sensed enters temperature sensor 113 through inlet port 116. Once inside the chamber, the gas is set into oscillation at a frequency indicative of its temperature in the manner previously described. The oscillating fluid is then exhausted through fluid coupler 117 and vented back to a low pressure region such as exhaust duct 112 by means of an interconnecting tube 118. The acoustic signal is separated from the hot gas in the fluid coupler 117 and is transmitted to any desired monitoring or control system by means of interconnecting passage 119. The monitoring or control system is not shown in FIGURE 5.

An alternate installation of the applicant's temperature sensor is also illustrated in FIGURE 5 wherein the applicant's temperature sensor identified by reference numeral 120 is located outside of combustion chamber 101. A perforated inlet passage 121 is provided inside combustion chamber 101 and is connected to inlet port 122 of temperature sensor 120 by means of interconnecting passage 123. The hot high pressure gas whose temperature is to be sensed is introduced into temperature sensor 120 through perforated inlet passage 121, interconnecting passage 123, and inlet port 122 where it is set into oscillation at a frequency indicative of its temperature in the manner previously described. The oscillating fluid is then exhausted through fluid coupler 124 and vented back to a low pressure region such as exhaust duct 112 by means of an interconnecting tube 125. The acoustic signal which was separated from the hot gas in fluid coupler 124 is transmitted to any desired monitoring or control system by means of interconnecting passage 126. The monitoring or control system is not shown in FIGURE 5.

Although the applicant's invention has been described and illustrated in detail, it should be understood that the same is by way of illustration and example only and is not to be taken by way of limitation.

I claim:

1. Apparatus respective to fluid temperature comprising:
    housing means having a three-dimensional chamber therein aligned with a first axis, said housing means having an outlet port therein in communication with said chamber and aligned with said first axis, said housing means having an inlet port aligned with a second axis for introducing fluid into said chamber, said second axis being substantially perpendicular to said first axis and intersecting therewith, said outlet port providing a greater impedance to fluid flow than said inlet port; and
    a splitter element positioned within said chamber and aligned with said second axis so that fluid introduced through said inlet port impinges on the apex of said splitter element and is set into oscillation whereby to produce a fluid signal at the outlet port, the fluid signal having a frequency indicative of the temperature of the fluid within said chamber, said splitter element axially extending along said second axis a distance greater than one half of the axial extent of said chamber along said second axis.

2. The apparatus of claim 1 wherein said splitter element is slideable relative to said housing means along said second axis and means are provided for locking said splitter element relative to said housing means.

3. The apparatus of claim 1 further including a fluid coupler connected to said outlet port and readout means responsive to an oscillating fluid signal connected to said fluid coupler.

4. Apparatus responsive to fluid temperature comprising:
  housing means having a cavity therein aligned with a first axis, said housing means having an inlet port aligned with a second axis for introducing a fluid of variable temperature, said second axis being transverse with respect to said first axis and intersecting therewith;
  piston means positioned within said cavity and slideable with respect to said housing means along said first axis, said housing means and said piston means cooperating to form a three-dimensional chamber, said piston means having an outlet port therein in communication with said chamber, said outlet port providing a greater impedance to fluid flow than said inlet port;
  means for locking said piston means with respect to said housing means; and
  a splitter element positioned within said chamber and aligned with said second axis so that fluid introduced through said inlet port impinges on the apex of said splitter element and is set into oscillation whereby to produce a fluid signal at the outlet port, the fluid signal having a frequency indicative of the temperature of the fluid within said chamber.

5. The apparatus of claim 4 wherein said splitter element is slideable relative to said housing means along said second axis and means are provided for locking said splitter element relative to said housing means.

6. The apparatus of claim 3 further including a fluid coupler connected to said outlet port and readout means responsive to an oscillating fluid signal connected to said fluid coupler.

7. A temperature monitoring system comprising:
  a gas turbine engine having a combustion chamber therein, said gas turbine engine having a sensing port therein in communication with said combustion chamber;
  a pure fluid temperature sensor including housing means having a three-dimensional chamber therein aligned with a first axis, said housing means having an outlet port therein in communication with said three-dimensional chamber, said housing means having an inlet port therein in communication with said three-dimensional chamber aligned with a second axis transverse with respect to said first axis and intersecting therewith, said outlet port providing a greater impedance to fluid flow than said inlet port, a splitter element located within said three-dimensional chamber and attached to said housing means, said splitter element being aligned with said second axis, the apex of said splitter element intersecting said second axis;
  means connecting said sensing port to said inlet port of said fluid temperature sensor whereby fluid flows from said combustion chamber into said three-dimensional chamber and impinges on said splitter element thereby causing the fluid within said three-dimensional chamber to oscillate at a frequency indicative of its temperature;
  readout means; and
  means connecting said outlet port to said readout means so as to provide a signal indicative of the temperature of the fluid within said combustion chamber.

8. A temperature monitoring system of claim 7 wherein said fluid temperature sensor is mounted substantially within said combustion chamber.

9. The temperature monitoring system of claim 7 wherein said splitter element of said fluid temperature sensor is slideable relative to said housing means along said second axis and means are provided for locking said splitter element relative to said housing means.

10. The temperature monitoring system of claim 7 wherein a piston means is positioned within said three-dimensional chamber and is slideable with respect to said housing means along said first axis and means are provided for locking said piston means with respect to said housing means.

11. Temperature responsive apparatus comprising:
  housing means enclosing a chamber having an inlet port aligned with an axis for introducing a fluid of variable temperature and an outlet port spaced from the inlet port, the chamber forming an expanded area around the inlet port in all directions perpendicular to the axis, impedance to fluid flow out of the chamber being greater than impedance to fluid flow into the chamber;
  and a splitter element positioned within the chamber and aligned with the inlet port so that fluid introduced through the inlet port impinges on the apex of the splitter element and is set into oscillation whereby to produce a fluid signal at the outlet port, the fluid signal having a frequency indicative of the temperature of the fluid within the chamber.

12. The apparatus of claim 11 further including means responsive to an oscillating fluid signal and means connecting said last named means to the outlet port in said housing means.

References Cited

UNITED STATES PATENTS

| 2,582,232 | 1/1952 | Cesaro et al. | 73—24 XR |
| 3,314,294 | 4/1967 | Colston | 73—357 |

FOREIGN PATENTS

| 749,598 | 4/1956 | Great Britain. |
| 1,014,420 | 12/1965 | Great Britain. |

LOUIS R. PRINCE, *Primary Examiner.*

FREDERICK SHOON, *Assistant Examiner.*

U.S. Cl. X.R.

73—339, 357; 137—81.5